July 8, 1941.  H. P. PHILLIPS  2,248,779

PISTON

Filed Jan. 6, 1940

INVENTOR;
HAROLD P. PHILLIPS
BY J. Henry Kinsely
ATTORNEY

Patented July 8, 1941

2,248,779

UNITED STATES PATENT OFFICE 2,248,779

PISTON

Harold P. Phillips, Webster Groves, Mo., assignor to McQuay-Norris Manufacturing Company, St. Louis, Mo., a corporation of Delaware Application January 6, 1940, Serial No. 312,773

11 Claims. (Cl. 309—7)

My invention relates to pistons and more particularly to pistons adapted for use in internal combustion engines and constructed so that the piston cannot rock in the cylinder in which it is used.

Pistons are constructed as light as possible and frequently they are made of aluminum and are used in cast iron cylinders. After the cylinder and piston become heated, the aluminum piston expands to a greater extent than does the cast iron cylinder and fits tighter therein than when the cylinder and piston are cold. Because of the increased pressure exerted by the piston on the cylinder wall the added friction between the piston and the cylinder increases piston wear substantially so that after considerable use the piston no longer fits snugly in the cylinder, but is loose enough to rock therein.

In order to overcome the deficiencies mentioned above, my invention contemplates a piston provided with the entire cylinder contacting surface comprised of a plurality of slit, resilient, ring-shaped members each secured at certain points to the piston so that the ring members cannot move at these points relative to the piston, whereby rocking of the piston in the cylinder is prevented or reduced. However, the members can expand and contract radially since the points at which the members are secured to the piston preferably are positioned remote from each ring gap. Though the cylinder or cylinder contacting face wears after considerable use a snug fit therebetween is maintained at all times because of the inherent resiliency of the ring members.

The ring members, briefly described above, are used on a piston comprised of the usual head and skirt, but the skirt preferably is of a substantially smaller diameter than the cylinder in which the piston is used. The piston has a plurality of annular grooves therein arranged and adapted to receive the ring members. The piston may be constructed of any suitable material, preferably aluminum, and the ring members may be made of the same material as the cylinder in which the piston is used so that relative expansion of the cylinder and the ring members is the same.

Having thus briefly described my new and improved piston it should be understood that one object of my invention is to provide a piston which will not rock in the cylinder in which the piston is used.

Another object of my invention is to provide a piston which will exert a substantially uniform pressure on the cylinder throughout the life of the piston, even though the piston is constructed of a material whose relative expansion when heated is not the same as the cylinder in which the piston reciprocates.

A more specific object of my invention is to provide a piston which may be made of any suitable material and is provided with a cylinder contacting surface which may be formed of the same material as the cylinder in which the piston is used.

Other objects and advantages will be apparent to those skilled in the art from the following description wherein reference is made to the drawing illustrating a preferred embodiment of my invention, and wherein similar reference numerals designate similar parts throughout the several views.

One embodiment of a piston constructed according to my invention is shown in the accompanying drawing, wherein Fig. 1 is a side elevation of the piston;

Figure 1:
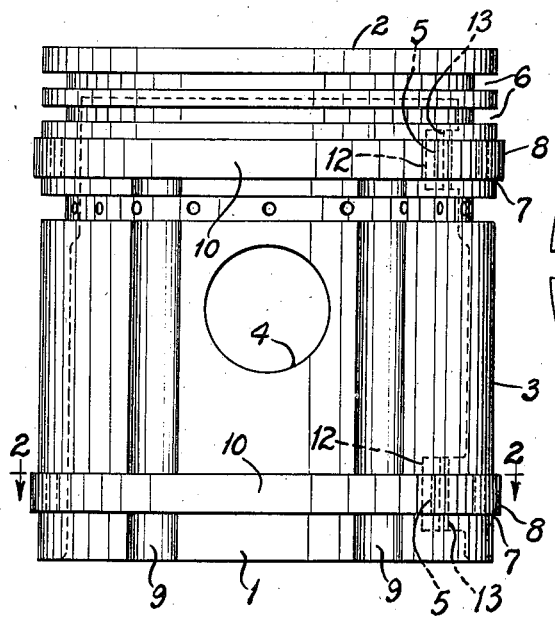
Figure 3:
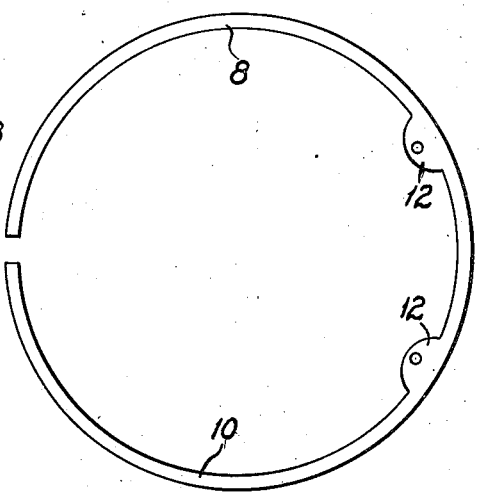
Fig. 3 is a plan view of a ring member as used on the piston.
Figure 2:
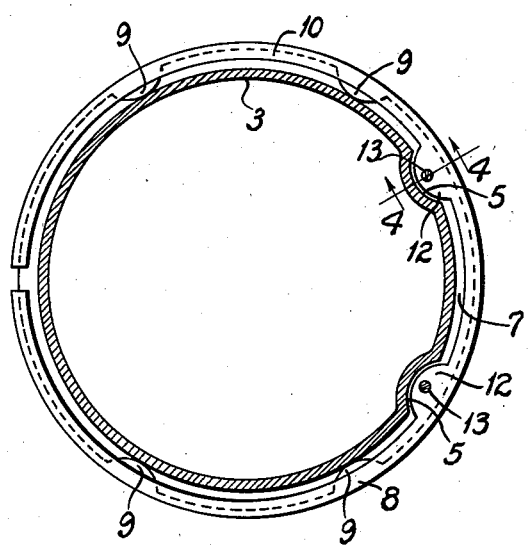
Fig. 2 is a horizontal section on the line 2—2 of Fig. 1.
Figure 4:
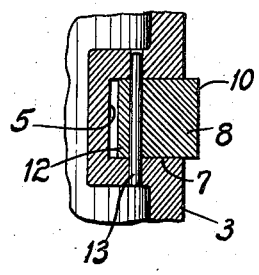
Fig. 4 is a detail view showing a section of certain parts as included in this embodiment of my invention.

Referring to the drawing, the piston 1 shown therein as constructed according to my invention, comprises a head 2, a skirt 3 and the usual wrist pin bosses 4. The head 2 has arranged therein the usual ring grooves 6 adapted to receive packing rings of the kind now employed for preventing escape of gases and liquids between the piston and the cylinder. In the embodiment shown, the skirt 3 has provided therein a plurality of ring grooves 7, each arranged and adapted to receive a ring member 8 described more fully below. Each ring groove 7 is deep enough so that a ring member 8 may expand and contract radially therein without contacting the bottom of the groove. The skirt 3 also has depressions 5 therein and has positioned on the outer surface thereof longitudinal grooves 9, preferably arranged so as to be out of registry with the bosses 4, all for the purpose hereinafter mentioned.

The ring members 8 each is comprised of a resilient slit band 10 which is loaded so that the ring member is under tension to counteract wear of either the cylinder or the ring member. Also, the resiliency of the ring members enables the ring members to support the piston 1 so that the piston is prevented from rocking in the cylinder in which it is used.

In the embodiment shown the ring members 8 each is provided with a pair of bosses 12 drilled and arranged to be fastened to the piston, preferably at the thrust side thereof, by means of a pin 13 so that the members 8 cannot move at these points relative to the piston 1, although the members may expand or contract radially at other points relative thereto. For this reason, the bosses 12 are positioned preferably on the ring member 8 at a point remote from the ring gap. Obviously means other than that described herein may be used to fasten the ring members to the piston and, any suitable number of such means may be used.

In the present embodiment one ring member 8 is positioned on the skirt 3 and another ring member 8 is positioned on the head 2, but under some circumstances it may be expedient to place all of the ring members on the piston skirt. Also, the ring members may perform the function of either a compression ring, or an oil control ring.

The grooves 9 in the piston 1 are provided to receive the bosses 12 when the ring members 8 are installed on the piston, and the depressions 5 in the skirt are provided to accommodate the bosses 12 when the ring members are positioned properly on the piston.

The ring members 8 are installed on the piston as follows:

The bosses 12 are positioned in registry with the grooves 9 and then the ring member 8 is moved axially along the piston 1 until the bosses 12 are in registry with the groove 7 in which the member is to be installed. The member then is rotated relative to the piston with the bosses 12 in this groove until the bosses are in registry with the depressions 5 in the piston skirt 3.

The piston 1 may be constructed of any suitable material, such as aluminum, so that the piston is as light as possible, and the ring members 8 may be formed of the same material as the cylinder in which the piston is used so that after the piston and cylinder become heated, relative expansion thereof will be the same.

In operation the ring members 8 carry the piston 1 and contact the cylinder, and for this reason the piston skirt 3 may be made substantially smaller than the cylinder in which the piston is used, the clearance of the piston skirt in the cylinder preferably ranging from 1/64 inch to 1/16 inch.

From the above description it is obvious that all the advantages of a light weight piston may be had plus the wear factor and low expansion characteristics of cast iron pistons. Besides, any wear on the cylinder or cylinder contacting surface is taken up by the inherent resiliency of the ring members.

The close fit of the piston in the cylinder, as necessary heretofore in the use of aluminum pistons, is eliminated and a piston having substantial clearance may be used. Only the broad limits of adjustment necessary to ring installation is necessary in fitting a piston to the cylinder. The piston cannot rock in the cylinder because the ring members 8 are secured to the piston at certain points and exert a substantially uniform pressure on the cylinder wall throughout the life of the piston because wear is counteracted by the inherent resiliency of the ring members. Hence, if any sidewise relative movement occurs, such movement is restrained and absorbed by the resilience of the ring members 8.

Other arrangements may be used without deviating from the scope of my invention, and while I describe a particular construction embodying my invention, it is of course evident that the construction may be varied in many particulars within the limits of the appended claims, and, therefore, I do not limit myself to the form and arrangement shown and described.

What I claim as new and desire to secure by Letters Patent, is:

1. A ring member adapted for use on a piston as a cylinder contacting surface and comprising a resilient band having arranged thereon means for securing said member to said piston so that radial movement of said member relative to said piston at points of attachment is prevented.

2. A ring member adapted for use on a piston as a cylinder contacting surface and comprising a resilient, slit band having arranged thereon a plurality of bosses for securing said member to said piston so that radial movement of said member relative to said piston at points of attachment is prevented, and said member being loaded so that wear is counteracted by the resiliency thereof.

3. A piston comprising a head and a skirt, said piston having positioned thereon a plurality of spaced ring members formed of resilient bands and adapted to contact the cylinder in which said piston is used, and means for securing said bands to said piston so that rocking of said piston in said cylinder is restrained.

4. A piston comprising a head and a skirt, said skirt having a diameter substantially less than the diameter of the cylinder in which said piston is used, said piston having positioned thereon a plurality of ring members formed of resilient bands and adapted to contact the walls of said cylinder, and means for securing said bands to said piston at the thrust side thereof whereby said members are maintained in fixed radial position on said piston at points of attachment.

5. A piston comprising a head and a skirt, said piston having positioned thereon a plurality of spaced ring members formed of resilient, slit bands and adapted to contact the cylinder in which said piston is used, means for securing said members to said piston so that rocking of said piston in said cylinder is restrained, and said members being loaded so that wear is counteracted by the resiliency thereof.

6. A piston comprising a head and a skirt, said skirt having a diameter substantially less than the diameter of the cylinder in which said piston is used, said piston having positioned thereon a plurality of ring members formed of resilient, slit bands and adapted to contact the walls of said cylinder, and a pair of bosses on each band adapted to secure said member to said piston so that rocking of said piston in said cylinder is restrained.

7. A piston comprising a head and a skirt, said piston having positioned thereon a plurality of ring members formed of resilient, slit bands and adapted to contact the cylinder in which said piston is used, and a pair of bosses positioned on each band remote from the slit therein and adapted to secure said member to said piston so that rocking of said piston in said cylinder is restrained.

8. A piston comprising a head and a skirt, said skirt having a substantially smaller diameter than the diameter of the cylinder in which said piston is used, said piston having positioned thereon a plurality of ring members formed of resilient, slit bands and adapted to contact the walls of said cylinder, and a pair of bosses positioned on each band remote from the slit therein and adapted to secure said member to said piston at points on the thrust side thereof so that rocking of said piston in said cylinder is restrained.

9. A piston comprising a head and a skirt, said skirt having positioned thereon a plurality of ring members formed of resilient bands, a pair of bosses formed on each band and adapted to receive a pin to secure said member to said piston whereby said members are maintained in the same relative position on said skirt at the points of attachment and rocking of said piston in said cylinder is restrained.

10. The combination with an internal combustion engine piston which when cold is diametrically smaller than the cylinder in which it operates, of a plurality of bearing rings, one such ring disposed adjacent the head of the piston and another such ring disposed adjacent the bottom of the piston, said rings being constructed and arranged to expand without seizure against the cylinder and to permit the piston to expand therein, and means connecting said rings to said piston, said connecting means arranged to transmit side thrust from the piston to the ring without play thereat.

11. The combination with an internal combustion engine piston which when cold is diametrically smaller than the cylinder in which it operates, of a bearing ring disposed adjacent the bottom of the piston, said ring being constructed and arranged to expand without seizure against the cylinder and to permit expansion of the piston therewithin, and means connecting said ring to said piston, said connecting means arranged to transmit side thrust from the piston to the ring without play thereat.

HAROLD P. PHILLIPS.